US010089510B2

(12) United States Patent
Ding (10) Patent No.: US 10,089,510 B2
(45) Date of Patent: Oct. 2, 2018

(54) DISPLAY CONTROL METHODS AND APPARATUSES

(71) Applicant: Beijing Zhigu Rui Tuo Tech Co., Ltd, Beijing (CN)

(72) Inventor: Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 26 days.

(21) Appl. No.: 15/197,631

(22) Filed: Jun. 29, 2016

(65) Prior Publication Data

US 2017/0004372 A1  Jan. 5, 2017

(30) Foreign Application Priority Data

Jun. 30, 2015  (CN) .......................... 2015 1 0385654

(51) Int. Cl.
*G09G 5/00* (2006.01)
*G06K 7/14* (2006.01)
*G06F 1/00* (2006.01)
*G06F 3/00* (2006.01)

(52) U.S. Cl.
CPC ............. *G06K 7/1417* (2013.01); *G06F 1/00* (2013.01); *G06F 3/00* (2013.01)

(58) Field of Classification Search
CPC ................................ G06F 3/00; G06K 9/3275
USPC ........................... 345/660–671, 648; 382/174
See application file for complete search history.

(56) References Cited

U.S. PATENT DOCUMENTS

| 6,332,046 B1* | 12/2001 | Fujimoto | G06K 9/00463 382/174 |
| 6,367,933 B1* | 4/2002 | Chen | H04N 3/2335 348/744 |
| 7,347,564 B2* | 3/2008 | Matsumoto | G06T 3/0006 345/647 |
| 8,194,101 B1* | 6/2012 | Mann | G09G 5/00 345/633 |

(Continued)

FOREIGN PATENT DOCUMENTS

| CN | 101483719 A | 7/2009 |
| CN | 101893934 A | 11/2010 |

(Continued)

OTHER PUBLICATIONS

Office Action dated Oct. 20, 2017 for U.S. Appl. No. 15/197,664, 38 pages.

(Continued)

*Primary Examiner* — Ryan R Yang
(74) *Attorney, Agent, or Firm* — Amin, Turocy & Watson, LLP (57) ABSTRACT

Various display control methods and apparatuses are provided. A method comprises: acquiring azimuth information of a lens relative to a display plane, determining a desired display area of a display content of the display plane in the display plane according to the azimuth information, and adjusting a display position of the display content on the display plane according to the desired display area. A complicated operation that the lens looks for and/or is aligned with the display content is simplified, and the probability of active discovery of the display content and the probability of capturing the display content displayed in the display plane by the lens are thereby increased.

27 Claims, 6 Drawing Sheets

(56) References Cited

U.S. PATENT DOCUMENTS

| | | | |
|---|---|---|---|
| 8,439,257 B2 | 5/2013 | Beals et al. | |
| 8,668,137 B2 | 3/2014 | Herzig | |
| 9,749,619 B2* | 8/2017 | Mann | H04N 13/0497 |
| 2005/0094108 A1* | 5/2005 | Kobayashi | H04N 5/74 |
| | | | 353/69 |
| 2005/0214662 A1* | 9/2005 | Kobayashi | H04N 9/3185 |
| | | | 430/22 |
| 2005/0242189 A1 | 11/2005 | Rohs | |
| 2006/0290896 A1* | 12/2006 | Nishida | G03B 21/14 |
| | | | 353/69 |
| 2009/0180004 A1 | 7/2009 | Shioda | |
| 2009/0190838 A1* | 7/2009 | Albrecht | G06K 9/2063 |
| | | | 382/209 |
| 2011/0178708 A1 | 7/2011 | Zhang at al. | |
| 2013/0022231 A1* | 1/2013 | Nepomniachtchi | G06Q 20/042 |
| | | | 382/102 |
| 2016/0055671 A1* | 2/2016 | Menozzi | G06T 7/73 |
| | | | 701/300 |

FOREIGN PATENT DOCUMENTS

| | | |
|---|---|---|
| CN | 102681755 A | 9/2012 |
| CN | 102681775 A | 9/2012 |
| CN | 103365481 A | 10/2013 |
| CN | 103366659 A | 10/2013 |
| CN | 103869963 A | 6/2014 |
| CN | 104267816 A | 1/2015 |
| CN | 104519347 A | 4/2015 |
| CN | 104766315 A | 7/2015 |
| CN | 104978009 A | 10/2015 |

OTHER PUBLICATIONS

Chinese Office Action dated May 3, 2018 for U.S. Appl. No. 201510385654.5, 7 pages.

Office Action dated Feb. 27, 2018 for U.S. Appl. No. 15/197,664, 42 pages.

Chinese Office Action dated Jun. 26, 2018 for Chinese Patent Application No. 201510385696.9, 14 pages (with translation).

* cited by examiner

DISPLAY CONTROL METHODS AND APPARATUSES

RELATED APPLICATION

The present application claims the benefit of priority to Chinese Patent Application No. 201510385654.5, filed on Jun. 30, 2015, and entitled "Display Control Methods and Apparatuses", which application is hereby incorporated into the present application by reference herein in its entirety.

TECHNICAL FIELD

The present application relates to the field of display technologies, and, for example, to various display control methods and apparatuses.

BACKGROUND

With continuous development of science and technology, for example, two-dimension code and other information, payment carriers are continually enhanced, the carriers can carry rich contents and information in simple forms, facilitating users to scan the code in a simple way, applications thereof are increasingly popular and extensive, for example, it is possible to display two-dimension code on a certain display plane in scenarios such as shopping, payment, anti-counterfeiting and interaction, it is possible to start a certain code scanning software, to align a lens (e.g., a camera of a mobile phone or the like) with the two-dimension code to obtain an image of the two-dimension code, and related contents and information carried in the two-dimension code can be obtained by decoding the image of the two-dimension code acquired by the lens through the code scanning software.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

Example embodiments of the present application provide various display control methods and apparatuses.

In a first aspect, an example embodiment of the present application provides a display control method, comprising:

acquiring azimuth information of a lens relative to a display plane;

determining a desired display area of a display content of the display plane in the display plane according to the azimuth information; and adjusting a display position of the display content on the display plane according to the desired display area.

In a second aspect, an example embodiment of the present application provides a display control apparatus, comprising:

an azimuth information acquisition module, configured to acquire azimuth information of a lens relative to a display plane;

a desired display area determination module, configured to determine a desired display area of a display content of the display plane in the display plane according to the azimuth information; and a display position adjustment module, configured to adjust a display position of the display content on the display plane according to the desired display area.

In a third aspect, an example embodiment of the present application further provides a display control apparatus, comprising:

a processor, a communication interface, a memory and a communication bus; the processor, the communication interface and the memory accomplishing mutual communication through the communication bus;

the memory being configured to store at least one instruction; the instruction causing the processor to perform the following operations:

acquiring azimuth information of a lens relative to a display plane;

determining a desired display area of a display content of the display plane in the display plane according to the azimuth information; and adjusting a display position of the display content on the display plane according to the desired display area.

In one or more example embodiments of the present application, it is feasible to acquire azimuth information of a lens relative to a display plane, determine a desired display area of a display content of the display plane in the display plane according to the azimuth information, and adjust a display position of the display content on the display plane according to the desired display area, to cause the adjusted display position of the display content on the display plane to match the desired display area; such processing is equivalent to adaptively adjusting the display position of the display content on the display plane according to the azimuth information, which simplifies a complicated operation that the lens looks for and/or is aligned with the display content to some extent, and increases the probability of active discovery of the display content and the probability of capturing the display content displayed in the display plane by the lens.

These and other embodiments of the present application will be more evident through the following detailed description of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Persons skilled in the art should understand that components in the accompanying drawings are shown merely for simplicity and clearness, and are not always drawn to scale. For example, sizes of some components in the accompanying drawings may be amplified relative to other components, so as to facilitate enhancing the understanding of embodiments of the present application.

DETAILED DESCRIPTION

Example embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Example embodiments of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

Figure 1:
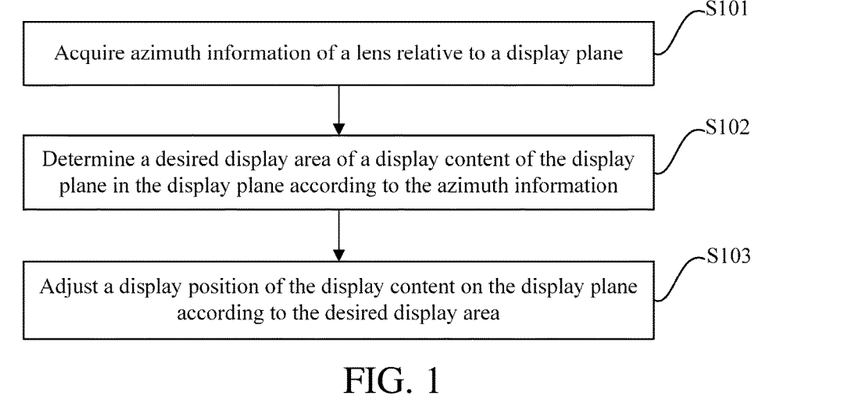
FIG. 1 is a flowchart of a display control method according to an example embodiment of the present application.

FIG. 1 is a flowchart of a display control method according to an embodiment of the present application. An execution body of the display control method according to the embodiment of the present application may be a certain display control apparatus, and the display control apparatus may perform content display control by executing the display control method during applications, which comprise, but are not limited to, content display and video playback. Device manifestations of the display control apparatus are not limited, for example, the display control apparatus may be a certain separate component, and the component cooperates with a display device with a display screen or a display device that can form a certain display plane in space for communications; or the display control apparatus may be integrated, as a certain functional module, into a display device with a display screen or a display device that can form a certain display plane in space. Specifically, as shown in FIG. 1, a display control method according to an embodiment of the present application comprises:

S101: Acquire azimuth information of a lens relative to a display plane.

S102: Determine a desired display area of a display content of the display plane in the display plane according to the azimuth information.

S103: Adjust a display position of the display content on the display plane according to the desired display area.

In this regard, if it is necessary to acquire a certain display content displayed by a display plane through a lens, in the traditional method, a display position of the display content on the display plane is usually unchanged, and only if the lens is in a particular position can the display content be shot. By taking that the display content is a two-dimensional code as an example, a user needs to find the two-dimensional code on the display plane and then align the lens with the two-dimensional code to scan the two-dimensional code, the traditional method causes operational inconvenience to the user, and in addition, for merchants that hope to make promotion through the two-dimensional code, if the display position of the two-dimensional code displayed on the display plane is unchanged, the user pays little attention thereto.

To this end, the embodiment of the present application can acquire azimuth information of a lens relative to a display plane, determine a desired display area of a display content of the display plane in the display plane according to the azimuth information, and adjust a display position of the display content on the display plane according to the desired display area, to cause the adjusted display position of the display content on the display plane to match the desired display area; such processing is equivalent to adaptively adjusting the display position of the display content on the display plane according to the azimuth information, which simplifies a complicated operation that the lens looks for and/or is aligned with the display content to some extent, and increases the probability of active discovery of the display content and the probability of capturing the display content displayed in the display plane by the lens.

Specifically, in the example embodiment of the present application, the lens comprises at least one optical element, which may comprise, but not limited to, a camera or a professional lens or the like, and may serve as, but not limited to, for example, a shooting element of a device having an imaging function (hereinafter referred to as imaging device) such as a mobile phone or a camera. Light of a content to be shot is transmitted, via the lens, to an imaging place such as an image sensing unit for imaging.

The display plane is a plane where a source content is displayed through light. In different display technologies, specific manifestations of the display plane vary, for example, the source content, via light of a display device, may be imaged on a certain display screen, imaged on a certain plane before or after the display screen, or projected on a certain plane in space, and correspondingly, the display screen, the plane before or after the display screen, or the plane in space is the display plane in the embodiment of the present application.

For different azimuth information, areas of the display plane that can be shot by the lens vary, and it is possible to determine a desired display area of a display content of the display plane in the display plane according to the azimuth information.

After the desired display area is determined, it is feasible to adjust a display position of the display content on the display plane according to the desired display area, to cause an actual display position of the display content on the display plane to match the desired display area, for example, the display content can be wholly adjusted into the desired display area for display, or the display content can be partially adjusted into the desired display area for display, and so on. Optionally, in an application scenario, for example, a certain two-dimensional code displayed by a certain display plane is "actively adjusted" to a certain desired display area of the display plane that can be shot by a mobile phone camera from a current display position of the display plane, equivalent to adaptively adjusting the display position of the two-dimensional code in the display plane according to azimuth information of the mobile phone camera relative to the display plane, which simplifies a complicated operation that the mobile phone camera looks for and/or is aligned with the two-dimensional code to some extent, and increases the probability of active discovery of the two-dimensional code displayed on the display plane and the probability of capturing the two-dimensional code displayed on the display plane by the mobile phone camera. It can be understood that the two-dimensional code displayed on the display plane is merely an optical form of the display content displayed on the display plane in the embodiment of the present application, and the display content may also be any form other than the two-dimensional code, for example, a certain advertisement content, encrypted pattern, anti-fake picture and the like, which is not repeated hereinafter any more.

The azimuth information indicates a relative spatial relationship between the lens and the display plane. Specific manifestations of the azimuth information are very flexible, which are not limited in the embodiment of the present application, for example, the azimuth information may comprise position information of the lens relative to the display plane, the position information may comprise, but not limited to, a three-dimensional space coordinate, such as a distance between the lens and the display plane and a coordinate of projection of the lens in the display plane, and/or the azimuth information may comprise orientation information of the lens relative to the display plane, the orientation information indicating a relative angle relationship between an optical axis direction of the lens and the display plane. By using the position information and/or the orientation information as the azimuth information, the relative spatial relationship between the lens and the display plane can be indicated more accurately.

In addition, the azimuth information may be acquired in a very flexible manner, which is not limited in the embodiment of the present application.

Optionally, it is possible to acquire the azimuth information of the lens relative to the display plane through communication between a display control apparatus and an imaging device comprising the lens, for example, it is possible to receive the azimuth information from an imaging device comprising the lens. The imaging device may use the display plane as a reference, acquire position information and/or orientation information of the imaging device respectively through, but not limited to, its own positioning and/or posture detection, optionally, it is possible to use the position information and/or orientation information of the imaging device as position information and/or orientation information of the lens, or, it is possible to further determine position information and/or orientation information of the lens according to the position information and/or orientation information of the imaging device, for example, position information and/or orientation information of the lens are/is determined by combining the position information and/or orientation information of the imaging device with layout (e.g., the lens is in the top right corner of the imaging device and the like) information of the imaging device. The solution can acquire the azimuth information from the imaging device, helping to reduce implementation complexity of the display control apparatus.

Alternatively, optionally, the display control apparatus can actively acquire the azimuth information, for example, the display control apparatus can detect the azimuth information of the lens relative to the display plane, and the solution can acquire the azimuth information through active detection of the display control apparatus on the lens, which can save interaction between the display control apparatus and the imaging device. The detection manner of the display control apparatus is very flexible, and optionally, it is possible to acquire an image of at least part of an imaging device comprising the lens, analyze the image and determine the azimuth information of the lens relative to the display plane at least according to an analysis result of the image. For example, the display control apparatus may shoot a whole or partial image of the imaging device, and can conduct texture analysis on the image, to acquire azimuth information corresponding to texture of the image through a pre-acquired corresponding relationship between texture and azimuth information; or, can conduct marker feature identification on the image, to determine the azimuth information according to an identification result; or the image may be a depth image acquired through a depth sensor, and the azimuth information can be obtained based on depth distribution information of the depth image; and so on. The azimuth information is acquired through an image analysis method, and the solution is simple and easy to implement. Further optionally, the determining the azimuth information of the lens relative to the display plane at least according to an analysis result of the image comprises: determining the azimuth information of the lens relative to the display plane according to the analysis result of the image and layout information of the lens in the imaging device. in an actual application, the imaging device is in a variety of forms, layout of the lens in different imaging devices also varies, and the solution combines the analysis result of the image with layout information of the lens in the imaging device to jointly determine the azimuth information of the lens relative to the display plane, which helps to improve the accuracy of determination of the azimuth information.

In the example embodiment of the present application, the desired display area is configured to represent an area where there is greater probability that the display plane is shot by the lens, and is determined in a very flexible manner, which is not limited in the embodiment of the present application.

Figure 2:
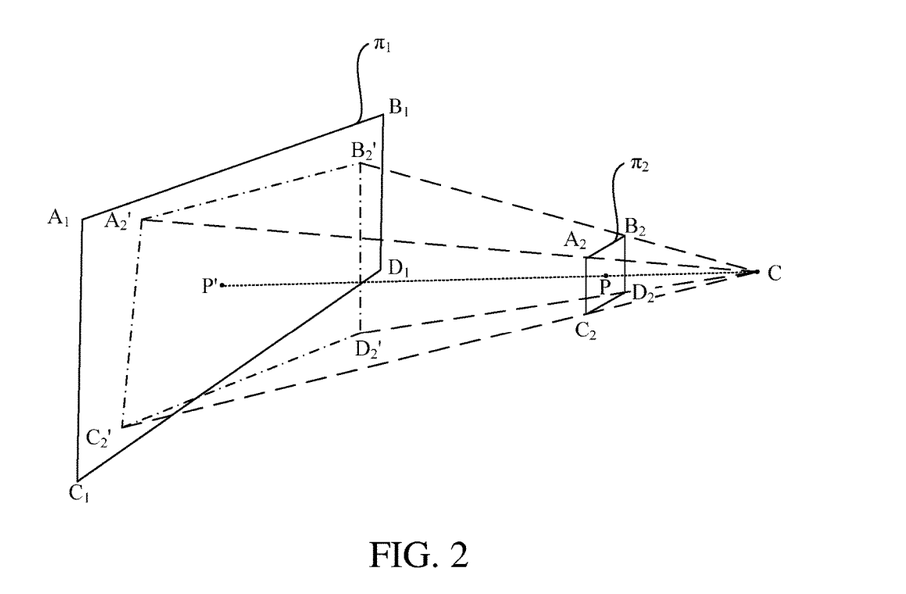
FIG. 2 illustrates a mapping relationship between a lens imaging area and a display area of a display plane according to an example embodiment of the present application.
Figure 3A:
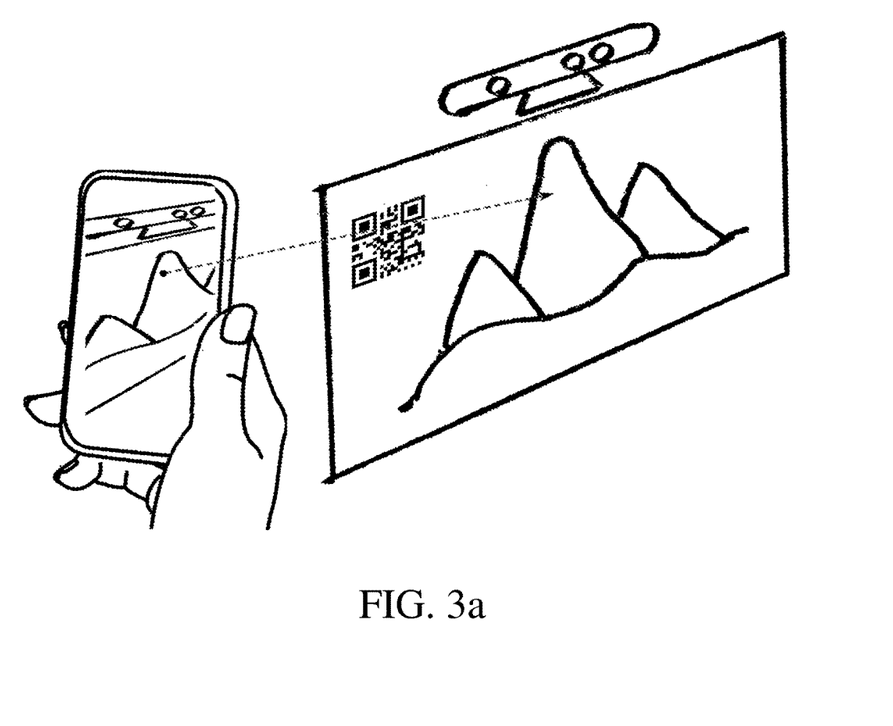
FIG. 3a illustrates an example where two-dimensional code is in a state before a display position is adjusted in an application scenario according to an example embodiment of the present application.
Figure 3B:
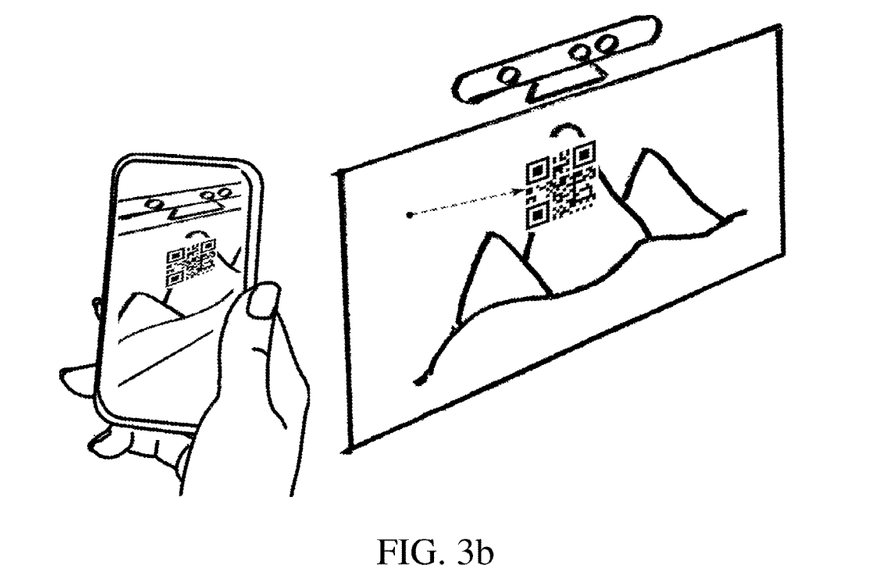
FIG. 3b illustrates an example where two-dimensional code is in a state after a display position is adjusted in an application scenario according to an example embodiment of the present application.

Optionally, the determining a desired display area of a display content of the display plane in the display plane according to the azimuth information comprises: determining an allowable imaging range comprising the lens according to the azimuth information; and determining the desired display area according to the allowable imaging range and the display plane. An optional light path is as shown in FIG. 2, $\pi_1$ is a display plane, and $A_1B_1C_1D_1$ is a display range of $\pi_1$ on the display plane; $\pi_2$ is an imaging plane of a certain camera, and $A_2B_2C_2D_2$ is an optical sensor sensitivity range of the camera; C is an optical center of the lens, P is a principal point on the imaging plane $\pi_2$, an intersection point of P on the display plane $\pi_1$ along an optical axis CP of the lens is P', and projection $A_2' B_2' C_2' D_2'$ of the optical sensor sensitivity range $A_2B_2C_2D_2$ on the display plane $\pi_1$ is the allowable imaging range. According to different azimuth information of the lens relative to the display plane, the projection of the optical sensor sensitivity range $A_2B_2C_2D_2$ on the display plane $\pi_1$ is $A_2' B_2' C_2' D_2'$ (that is, allowable imaging range), which may be completely the same as or partially the same as the desired display area of the display content on the display plane, and in an actual application, an area where the projection $A_2' B_2' C_2' D_2'$ overlaps with the display range $A_1B_1C_1D_1$ of the display plane $\pi_1$ may be used as the desired display area of the display content on the display plane. The accuracy of determining the desired display area by using the solution is high, and after the desired display area is determined, it is possible to adjust a display position of the display content on the display plane according to the desired display area, as shown in FIG. 3a and FIG. 3b, which thus achieves that the display position of the display content on the display plane is adaptively adjusted with the azimuth information of the lens relative to the display plane, simplifies a complicated operation that the mobile phone camera looks for and/or is aligned with the display content (e.g., two-dimensional code) to some extent, and increases the probability of active discovery of the display content (e.g., two-dimensional code) displayed on the display plane and the probability of capturing the display content (e.g., two-dimensional code) displayed on the display plane by the mobile phone camera.

Optionally, the determining a desired display area of a display content of the display plane in the display plane according to the azimuth information comprises: determining an intersection position between an optical axis of the lens and the display plane according to the azimuth information; and determining the desired display area according to the intersection position. As shown in FIG. 2, it is possible to determine that an intersection position between an optical axis CP of the lens and the display plane $\pi_1$ is P' and, according to that the position of the intersection point P' is a reference point, determine an area with a certain size comprising the reference point as the desired display area, for example, it is possible to determine an area with a certain size that takes the position of the intersection point P' as the center as the desired display area; the size of the desired display area determined in the solution may be set according to actual needs, for example, the size can be determined in combination with the size of the display content or the size of a key part in the display content, enabling the desired display area to meet the need of the display size of the display content or the key part of the display content. The desired display area is determined by using the solution, the solution is simple and easy to implement, and after the desired display area is determined, it is possible to adjust a display position of the display content according to the desired display area, for example, the display content is adjusted, from a current display position on the display plane, to the center of the display content or a position where the center of the key part of the display content is centrally aligned with an intersection point between the optical axis and the display plane in the desired display area, to display the display area or at least display the key part of the display content in the desired display area, which thus achieves that the display position of the display content on the display plane is adaptively adjusted with the azimuth information of the lens relative to the display plane, simplifies a complicated operation that the mobile phone camera looks for and/or is aligned with the display content to some extent, and increases the probability of active discovery of the display content displayed on the display plane and the probability of capturing the display content displayed on the display plane by the mobile phone camera.

In combination with any display control method according to the embodiment of the present application, optionally, after the desired display area is determined, the display control method further comprises: adjusting a scale of at least part of the display content according to the desired display area. During an actual application, the size of the desired display area does not completely match the size of at least part of the display content (the at least part of the display content is, for example, the whole of the display content or a key part of the display content and other parts); in this case, it is possible to adjust a scale of at least part of the display content according to the desired display area, to cause the size of the desired display area to meet the display demand of the at least part of the display content. Optionally, zoom-in or zoom-out of the display content may be relative to a current display area of the display content on the display plane, that is to say, if the size of the display area of the display content after zoom-out adjustment is greater than that of the current display area of the display content, it can be determined that the display content is zoom-in adjusted, and otherwise, if the size of the display area of the display content after zoom-out adjustment is less than that of the current display area of the display content, it can be determined that the display content is zoom-out adjusted.

For example, in response to that a current display area of the display content is greater than the desired display area, at least part of the display content is zoomed out according to the desired display area. Optionally, in response to that the size of the desired display area is less than that of the at least part of the display content, it is possible to, by combining the size of the desired display area with the size of the at least part of the display content, determine a zoom-out ratio of the at least part of the display content, adjust a display position of the display content on the display plane according to the desired display area, and zoom out the at least part of the display content according to the determined zoom-out ratio, to cause the size of the desired display area to meet the display demand of the at least part of the display content; in addition, determination of the zoom-out ratio can meet that the zoom-out degree is as small as possible in the case of meeting the display demand of the at least part of the display content, an ideal state is that the desired display area is filled with the at least part of the display content, and thus it is possible to display the at least part of the display content as large as possible in the case of meeting the display demand of the at least part of the display content, to increase the convenience at which the lens acquires the at least part of the display content and the imaging quality.

For another example, in response to that a current display area of the display content is less than the desired display area, at least part of the display content is zoomed in according to the desired display area. Optionally, in response to that the size of the desired display area is greater than that of the at least part of the display content, it is possible to, by combining the size of the desired display area with the size of the at least part of the display content, determine a zoom-in ratio of the at least part of the display content, adjust a display position of the display content on the display plane according to the desired display area, and zoom in the at least part of the display content according to the determined zoom-in ratio, to cause the size of the desired display area to meet the display demand of the at least part of the display content; in addition, determination of the zoom-out ratio can meet that the zoom-out degree is as small as possible in the case of meeting the display demand of the at least part of the display content, an ideal state is that the desired display area is filled with the at least part of the display content, and thus it is possible to display the at least part of the display content as large as possible in the case of meeting the display demand of the at least part of the display content, to increase the convenience at which the lens acquires the at least part of the display content and the imaging quality.

In combination with any display control method according to the embodiment of the present application, before adjusting a display position of the display content on the display plane, the display control method may further comprise a trigger mechanism of whether the display position of the display content is adjusted, to determine whether the display position of the display content is adjusted according to the trigger mechanism, thus meeting diversified actual application demands. The triggering adjusting the display position of the display content may comprise: trigger acquiring of the azimuth information and the desired display area and adjusting the display position of the display content on the display plane according to the desired display area; or acquisition of at least one of the azimuth information and the desired display area may be completed before adjustment of the display position of the display content is triggered, while the display position of the display content on the display plane is adjusted according to the desired display area when adjustment of the display position of the display content is triggered; and so on. The trigger mechanism of whether the display position of the display content is adjusted may be determined according to actual needs, which is not limited in the embodiment of the present application.

For example, before the display position of the display content on the display plane is adjusted, the display control method may further comprise: receiving a shooting request for the display content. Optionally, the imaging device comprising the lens may send a shooting request for the display content to the display control apparatus, and after receiving the shooting request, the display control apparatus may trigger adjusting the display position of the display content. The solution uses receiving a shooting request for the display content as a trigger mechanism of adjusting the position of the display content, for example, only when a shooting request for the content sent out by the imaging device comprising the lens is received can the display control apparatus triggers adjusting the position of the display content, which can thus avoid possible interference with the user's use caused by adaptive adjustment of the display position of the display content, equivalent to better matching between the adjustment of the display position of the display content and the shooting demand of the imaging device, thereby improving pertinence of adaptive adjustment of the display position and convenience of the user's use.

For another example, before the display position of the display content on the display plane is adjusted, the display control method may further comprise: receiving a display position adjustment request for the display content. Optionally, the imaging device comprising the lens may send a display position adjustment request for the display content to the display control apparatus, and after receiving the display position adjustment request, the display control apparatus may trigger adjusting the display position of the display content. The imaging device may determine according to actual needs whether it is necessary to send the display position adjustment request for the display content to the display control apparatus, for example, the imaging device may send the display position adjustment request to the display control apparatus when it is necessary to shoot the display content, or the imaging device may send the display position adjustment request to the display control apparatus after attempting to shoot the display content due to poor shooting quality or other reasons, and so on. The solution uses receiving a display position adjustment request for the display content as a trigger mechanism of adjusting the position of the display content, for example, only when a display position adjustment request for the display content sent out by the imaging device comprising the lens is received can the display control apparatus triggers adjusting the position of the display content, which can thus avoid possible interference with the user's use caused by adaptive adjustment of the display position of the display content, equivalent to better matching between the adjustment of the display position of the display content and the shooting demand of the imaging device, thereby improving pertinence of adaptive adjustment of the display position and convenience of the user's use.

For another example, before the display position of the display content on the display plane is adjusted, the display control method may further comprise: determining that the lens is within a view range of the display plane. Light of the display plane can reach a range where the receiving end is imaged in a certain view range, which is the view range of the display plane, for example, a view range displayed by a certain display screen is the view range of the display plane in the case that a display range of the display screen is used as the display plane, and so on. The display control apparatus can detect whether the lens is within a view range of the display plane through a camera, a distance sensor or the like, and if a detection result indicates that the lens is in the display range, it indicates that the probability that the lens shoots the display content is greater, or the probability that the lens can shoot the display content is greater, or the success probability that the display content is actively pushed to the lens is greater, and so on; therefore, it is possible to trigger adjusting the display position of the display content. The solution uses that the display control apparatus determines that the lens is within a view range of the display plane as a trigger mechanism of adjusting the position of the display content, which thus helps to increase the flexibility of active pushing of the display content, increases the discovery probability of the display content, and can simplify a complicated operation required by the imaging device to shoot the display content to some extent.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

Figure 4:
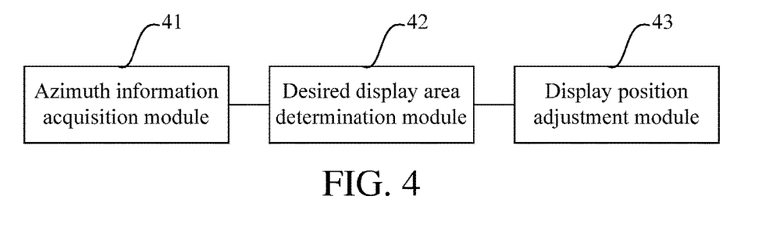
FIG. 4 is a logic block diagram of a first display control apparatus according to an example embodiment of the present application.

FIG. 4 is a logic block diagram of a first display control apparatus according to an embodiment of the present application. As shown in FIG. 4, a display control apparatus according to the embodiment of the present application comprises: an azimuth information acquisition module 41, a desired display area determination module 42 and a display position adjustment module 43.

The azimuth information acquisition module 41 is configured to acquire azimuth information of a lens relative to a display plane.

The desired display area determination module 42 is configured to determine a desired display area of a display content of the display plane in the display plane according to the azimuth information.

The display position adjustment module 43 is configured to adjust a display position of the display content on the display plane according to the desired display area.

In the example embodiment of the present application, it is feasible to acquire azimuth information of a lens relative to a display plane, determine a desired display area of a display content of the display plane in the display plane according to the azimuth information, and adjust a display position of the display content on the display plane according to the desired display area, to cause the adjusted display position of the display content on the display plane to match the desired display area; such processing is equivalent to adaptively adjusting the display position of the display content on the display plane according to the azimuth information, which simplifies a complicated operation that the lens looks for and/or is aligned with the display content to some extent, and increases the probability of active discovery of the display content and the probability of capturing the display content displayed in the display plane by the lens.

The display control apparatus may perform content display control by executing the display control method during applications, which comprise, but are not limited to, content display and video playback. Device manifestations of the display control apparatus are not limited, for example, the display control apparatus may be a certain separate component, and the component cooperates with a display device with a display screen or a display device that can form a certain display plane in space for communications; or the display control apparatus may be integrated, as a certain functional module, into a display device with a display screen or a display device that can form a certain display plane in space.

The azimuth information indicates a relative spatial relationship between the lens and the display plane. Optionally, the azimuth information comprises: position information and/or orientation information of the lens relative to the display plane. By using the position information and/or the orientation information as the azimuth information, the relative spatial relationship between the lens and the display plane can be indicated more accurately.

Figure 5:
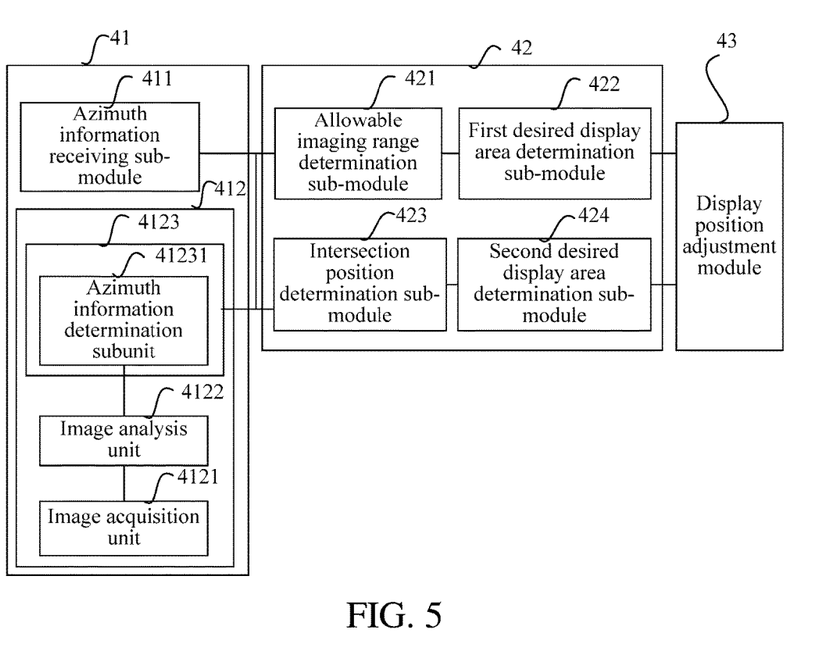
FIG. 5 is a logic block diagram of a second display control apparatus according to an example embodiment of the present application.

Optionally, as shown in FIG. 5, the azimuth information acquisition module 41 comprises: an azimuth information receiving sub-module 411. The azimuth information receiving sub-module 411 is configured to receive the azimuth information from an imaging device comprising the lens. The solution can acquire the azimuth information through active detection of the display control apparatus on the lens, which can save interaction between the display control apparatus and the imaging device.

Optionally, the azimuth information acquisition module 41 comprises: an azimuth information detection sub-module 412. The azimuth information detection sub-module 412 is configured to detect the azimuth information of the lens relative to the display plane. The azimuth information is acquired through an image analysis method, and the solution is simple and easy to implement. The solution can acquire the azimuth information from the imaging device, helping to reduce implementation complexity of the display control apparatus.

Further optionally, the azimuth information detection sub-module 412 comprises: an image acquisition unit 4121, an image analysis unit 4122 and an azimuth information determination unit 4123. The image acquisition unit 4121 is configured to acquire an image of at least part of the imaging device comprising the lens; the image analysis unit 4122 is configured to analyze the image; and the azimuth information determination unit 4123 is configured to determine the azimuth information of the lens relative to the display plane at least according to an analysis result of the image. The azimuth information is acquired by using the solution, which is simple and easy to implement.

Optionally, the azimuth information determination unit 4123 comprises: an azimuth information determination subunit 41231. The azimuth information determination subunit 41231 is configured to determine the azimuth information of the lens relative to the display plane according to the analysis result of the image and layout information of the lens in the imaging device. The solution combines the analysis result of the image with layout information of the lens in the imaging device to jointly determine the azimuth information of the lens relative to the display plane, which helps to improve the accuracy of determination of the azimuth information.

Optionally, the desired display area determination module 42 comprises: an allowable imaging range determination sub-module 421 and a first desired display area determination sub-module 422. The allowable imaging range determination sub-module 421 is configured to determine an allowable imaging range comprising the lens according to the azimuth information; and the first desired display area determination sub-module 422 is configured to determine the desired display area according to the allowable imaging range and the display plane. The accuracy of determining the desired display area by using the solution is high, and after the desired display area is determined, it is possible to adjust a display position of the display content on the display plane according to the desired display area, which thus achieves that the display position of the display content on the display plane is adaptively adjusted with the azimuth information of the lens relative to the display plane, simplifies a complicated operation that the mobile phone camera looks for and/or is aligned with the display content to some extent, and increases the probability of active discovery of the display content displayed on the display plane and the probability of capturing the display content displayed on the display plane by the mobile phone camera.

Optionally, the desired display area determination module 42 comprises: an intersection position determination sub-module 423 and a second desired display area determination sub-module 424. The intersection position determination sub-module 423 is configured to determine an intersection position between an optical axis of the lens and the display plane according to the azimuth information; and the second desired display area determination sub-module 424 is configured to determine the desired display area according to the intersection position. The desired display area is determined by using the solution, the solution is simple and easy to implement, and after the desired display area is determined, it is possible to adjust a display position of the display content according to the desired display area, for example, the display content is adjusted, from a current display position on the display plane, to the center of the display content or a position where the center of the key part of the display content is centrally aligned with an intersection point between the optical axis and the display plane in the desired display area, to display the display area or at least display the key part of the display content in the desired display area, which thus achieves that the display position of the display content on the display plane is adaptively adjusted with the azimuth information of the lens relative to the display plane, simplifies a complicated operation that the mobile phone camera looks for and/or is aligned with the display content to some extent, and increases the probability of active discovery of the display content displayed on the display plane and the probability of capturing the display content displayed on the display plane by the mobile phone camera.

Figure 6:
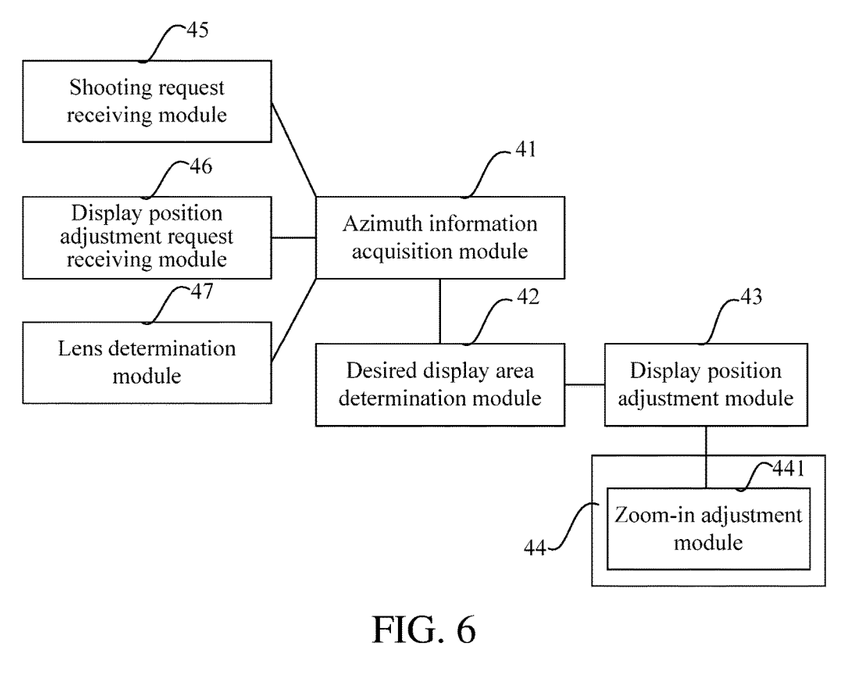
FIG. 6 is a logic block diagram of a third display control apparatus according to an example embodiment of the present application.

Optionally, as shown in FIG. 6, the display control apparatus further comprises: a zoom-out adjustment module 44. The zoom-out adjustment module 44 is configured to adjust a scale of at least part of the display content according to the desired display area. The solution can adjust a scale of at least part of the display content according to the desired display area, to cause the size of the desired display area to meet the display demand of the at least part of the display content.

Optionally, the zoom-out adjustment module 44 comprises: a zoom-in adjustment module 441. The zoom-in adjustment module 441 is configured to, in response to that a current display area of the display content is less than the desired display area, zoom in at least part of the display content according to the desired display area. The solution displays the at least part of the display content as large as possible in the case of meeting the display demand of the at least part of the display content, to increase the convenience at which the lens acquires the at least part of the display content and the imaging quality.

Optionally, the display control apparatus further comprises: a shooting request receiving module 45. The shooting request receiving module 45 is configured to receive a shooting request for the display content, and enable the azimuth information acquisition module, the desired display area determination module or the display position adjustment module according to a receiving result. The solution uses that the display control apparatus receives a shooting request for the display content as a trigger mechanism of adjusting the position of the display content, which can avoid possible interference with the user's use caused by adaptive adjustment of the display position of the display content, equivalent to better matching between the adjustment of the display position of the display content and the shooting demand of the imaging device, thereby improving pertinence of adaptive adjustment of the display position and convenience of the user's use.

Optionally, the display control apparatus further comprises: a display position adjustment request receiving module 46. The display position adjustment request receiving module 46 is configured to receive a display position adjustment request for the display content, and enable the azimuth information acquisition module, the desired display area determination module or the display position adjustment module according to a receiving result. The solution uses that the display control apparatus receives a display position adjustment request for the display content as a trigger mechanism of adjusting the position of the display content, which can avoid possible interference with the user's use caused by adaptive adjustment of the display position of the display content, equivalent to better matching between the adjustment of the display position of the display content and the shooting demand of the imaging device, thereby improving pertinence of adaptive adjustment of the display position and convenience of the user's use.

Optionally, the display control apparatus further comprises: a lens determination module 47. The lens determination module 47 is configured to determine that the lens is within a view range of the display plane, and enable the azimuth information acquisition module, the desired display area determination module or the display position adjustment module according to a determination result. The solution uses that the display control apparatus determines that the lens is within a view range of the display plane as a trigger mechanism of adjusting the position of the display content, which thus helps to increase the flexibility of active pushing of the display content, increases the discovery probability of the display content, and can simplify a complicated operation required by the imaging device to shoot the display content to some extent.

Figure 7:
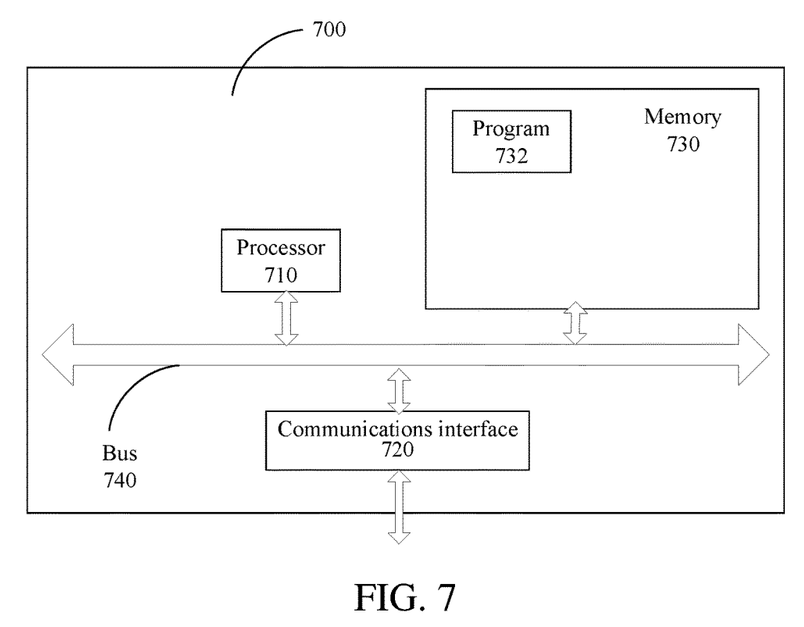
FIG. 7 is a logic block diagram of a fourth display control apparatus according to an example embodiment of the present application.

FIG. 7 is a logic block diagram of a fourth display control apparatus according to an embodiment of the present application; the specific embodiment of the present application does not limit the display control apparatus 700. As shown in FIG. 7, the display control apparatus 700 may comprise:

a processor 710, a communications interface 720, a memory 730, and a communications bus 740.

The processor 710, the communications interface 720, and the memory 730 communicate with each other via the communications bus 740.

The communications interface 720 is configured to communicate with, for example, a device having a communications function, an external light source or the like.

The processor 710 is configured to run a program 732, and specifically can perform the related steps in any one of the foregoing embodiments of the display control method.

For example, the program 732 may comprise program code, where the program code comprises a computer operating instruction.

The processor 710 may be a central processing unit (CPU), or an application specific integrated circuit (ASIC), or one or more integrated circuits configured to implement the embodiments of the present application.

The memory 730 is configured to store the program 732. The memory 730 may comprise a random access memory (RAM), or further comprise a non-volatile memory, for example, at least one magnetic disk memory.

For example, in an example embodiment, the processor 710 may run the program 732 to perform the following steps: acquiring azimuth information of a lens relative to a display plane; determining a desired display area of a display content of the display plane in the display plane according to the azimuth information; and adjusting a display position of the display content on the display plane according to the desired display area.

In other example embodiments, the processor 710 may also run the program 732 to perform the steps mentioned above in any one of the other embodiments, and details are not described herein again.

For the specific implementation of the steps in the program 732, reference may be made to the corresponding descriptions in the corresponding steps, modules, sub-modules and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, which are not described herein again.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the example embodiment. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the example embodiments of the present application essentially, or the part contributing to the prior art, or a part of the example embodiments may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation, or replace a feature in another implementation.

It should be emphasized that, terms "comprise/include" used herein refer to existence of a feature, an element, a step, or a component, but do not exclude existence or addition of one or more of other features, elements, steps, or components.

Finally, it should be noted that the foregoing example embodiments are merely used to describe the present application, but are not intended to limit the present application. A person of ordinary skill in the art may further make various variations and modifications without departing from the spirit and scope of the present application. Therefore, all the equivalent example embodiments also fall within the scope of the present application, and the patent protection scope of the present application should be defined by the claims.

What is claimed is:

1. A method, comprising:
    acquiring, by a device comprising a processor, azimuth information of a lens relative to a display plane;
    determining a desired display area in the display plane of display content of the display plane according to the azimuth information; and
    adjusting a display position of the display content on the display plane according to the display area, resulting in an adjusted display position of the display content on the display plane, to cause the adjusted display position to match the desired display area.

2. The method of claim 1, wherein the azimuth information comprises:
    at least one of position information or orientation information of the lens relative to the display plane.

3. The method of claim 1, wherein the acquiring the azimuth information of the lens relative to the display plane comprises:
    receiving the azimuth information from an imaging device comprising the lens.

4. The method of claim 1, wherein the acquiring the azimuth information of the lens relative to the display plane comprises:
    detecting the azimuth information of the lens relative to the display plane.

5. The method of claim 4, wherein the detecting the azimuth information of the lens relative to the display plane comprises:
    acquiring an image of at least part of the imaging device comprising the lens;
    analyzing the image; and
    determining the azimuth information of the lens relative to the display plane at least according to a result of the analyzing the image.

6. The method of claim 5, wherein the determining the azimuth information of the lens relative to the display plane at least according to the result of the analyzing the image comprises:
    determining the azimuth information of the lens relative to the display plane according to the result of the analyzing the image and layout information of the lens in the imaging device.

7. The method of claim 1, wherein the determining the desired display area in the display plane of the display content of the display plane according to the azimuth information comprises:
    determining an allowable imaging range comprising the lens according to the azimuth information; and
    determining the desired display area according to the allowable imaging range and the display plane.

8. The method of claim 1, wherein the determining the desired display area in the display plane of the display content of the display plane according to the azimuth information comprises:
    determining an intersection position between an optical axis of the lens and the display plane according to the azimuth information; and
    determining the desired display area according to the intersection position.

9. The method of claim 1, further comprising:
    after the desired display area is determined, adjusting a scale of at least part of the display content according to the desired display area.

10. The method of claim 9, wherein the adjusting the scale of at least the part of the display content according to the desired display area comprises:
in response to determining that a current display area of the display content is less than the desired display area, zooming in at least the part of the display content according to the desired display area.

11. The method of claim 1, further comprising:
before the adjusting the display position of the display content on the display plane, receiving a shooting request for the display content.

12. The method of claim 1, further comprising:
before the adjusting the display position of the display content on the display plane, receiving a display position adjustment request for the display content.

13. The method of claim 1, further comprising:
before the adjusting the display position of the display content on the display plane, determining that the lens is within a view range of the display plane.

14. An apparatus, comprising:
a memory that stores executable modules; and
a processor, coupled to the memory, that executes or facilitates execution of the executable modules, the executable modules comprising:
an azimuth information acquisition module configured to acquire azimuth information of a lens relative to a display plane;
a display area determination module configured to determine a desired display area of a display content of the display plane in the display plane according to the azimuth information; and
a display position adjustment module configured to adjust a display position of the display content on the display plane according to the desired display area, resulting in an adjusted display position of the display content on the display plane, to enable adjusting the adjusted display position to match the desired display area.

15. The apparatus of claim 14, wherein the azimuth information comprises: at least one of position information or orientation information of the lens relative to the display plane.

16. The apparatus of claim 14, wherein the azimuth information acquisition module comprises:
an azimuth information receiving sub-module configured to receive the azimuth information from an imaging device comprising the lens.

17. The apparatus of claim 14, wherein the azimuth information acquisition module comprises:
an azimuth information detection sub-module configured to detect the azimuth information of the lens relative to the display plane.

18. The apparatus of claim 17, wherein the azimuth information detection sub-module comprises:
an image acquisition unit configured to acquire an image of at least part of the imaging device comprising the lens;
an image analysis unit configured to analyze the image yielding an analysis result of the image; and
an azimuth information determination unit configured to determine the azimuth information of the lens relative to the display plane at least according to the analysis result of the image.

19. The apparatus of claim 18, wherein the azimuth information determination unit comprises:
an azimuth information determination subunit configured to determine the azimuth information of the lens relative to the display plane according to the analysis result of the image and layout information of the lens in the imaging device.

20. The apparatus of claim 14, wherein the desired display area determination module comprises:
an allowable imaging range determination sub-module configured to determine an allowable imaging range comprising the lens according to the azimuth information; and
a display area determination sub-module configured to determine the desired display area according to the allowable imaging range and the display plane.

21. The apparatus of claim 14, wherein the desired display area determination module comprises:
an intersection position determination sub-module configured to determine an intersection position between an optical axis of the lens and the display plane according to the azimuth information; and
a display area determination sub-module configured to determine the desired display area according to the intersection position.

22. The apparatus of claim 14, wherein the executable modules further comprise:
a zoom-out adjustment module configured to adjust a scale of at least part of the display content according to the desired display area.

23. The apparatus of claim 22, wherein the zoom-out adjustment module comprises:
a zoom-in adjustment module configured to, in response to a determination that a current display area of the display content is less than the desired display area, zoom in at least the part of the display content according to the desired display area.

24. The apparatus of claim 14, wherein the executable modules further comprise:
a shooting request receiving module configured to receive a shooting request for the display content, and enable the azimuth information acquisition module, the desired display area determination module or the display position adjustment module according to a receiving result.

25. The apparatus of claim 14, wherein the executable modules further comprise:
a display position adjustment request receiving module configured to receive a display position adjustment request for the display content, and enable the azimuth information acquisition module, the desired display area determination module or the display position adjustment module according to a receiving result.

26. The apparatus of claim 14, wherein the executable modules further comprise:
a lens determination module configured to determine that the lens is within a view range of the display plane, and enable the azimuth information acquisition module, the desired display area determination module or the display position adjustment module according to a determination result.

27. An apparatus, comprising:
a processor, a communication interface, a memory and a communication bus, wherein the processor, the communication interface and the memory accomplish mutual communication via the communication bus, wherein the memory is configured to store at least one instruction, the at least one instruction causing the processor to perform operations, comprising:
acquiring azimuth information of a lens relative to a display plane;

determining a target display area of a display content of the display plane in the display plane according to the azimuth information; and adjusting a display position of the display content on the display plane according to the target display area, resulting in an adjusted display position of the display content on the display plane, to cause the adjusted display position to align with the target display area.

\* \* \* \* \*